United States Patent
Akiyama et al.

(10) Patent No.: US 12,056,603 B2
(45) Date of Patent: Aug. 6, 2024

(54) OPTICAL COMMUNICATION ELEMENT AND OPTICAL NEURAL NETWORK

(71) Applicant: FUJITSU LIMITED, Kawasaki (JP)

(72) Inventors: Tomoyuki Akiyama, Yokohama (JP); Shinsuke Tanaka, Hiratsuka (JP); Yasuhiro Nakasha, Hadano (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 852 days.

(21) Appl. No.: 17/170,478

(22) Filed: Feb. 8, 2021

(65) Prior Publication Data

US 2021/0248454 A1    Aug. 12, 2021

(30) Foreign Application Priority Data

Feb. 12, 2020 (JP) ................. 2020-021221

(51) Int. Cl.
 *G06N 3/067* (2006.01)
 *G02B 6/293* (2006.01)
 *H04B 10/40* (2013.01)

(52) U.S. Cl.
 CPC ....... *G06N 3/0675* (2013.01); *G02B 6/29301* (2013.01); *H04B 10/40* (2013.01)

(58) Field of Classification Search
 None
 See application file for complete search history.

(56) References Cited

U.S. PATENT DOCUMENTS

2020/0209480 A1* 7/2020 Rickman .............. G02B 6/2808

FOREIGN PATENT DOCUMENTS

| CN | 109254350 A | * 1/2019 | ............... G02B 6/12 |
|---|---|---|---|
| JP | 2001-183710 | 7/2001 | |
| JP | 2004-138785 | 5/2004 | |
| JP | 2018-200391 A | 12/2018 | |
| JP | 2019-101887 A | 6/2019 | |
| JP | 2019-523932 | 8/2019 | |
| WO | 2017/210550 A1 | 12/2017 | |

OTHER PUBLICATIONS

JPOA—Office Action of Japanese Patent Application No. 2020-021221 dated Jun. 6, 2023 with Machine Translation.

* cited by examiner

*Primary Examiner* — Eric L Bolda
(74) *Attorney, Agent, or Firm* — Fujitsu Intellectual Property Center (57) ABSTRACT

An optical communication element includes a plurality of slabs, an input port group, an output port group, a first waveguide group, and a second waveguide group. The plurality of slabs includes third waveguide. Each of the plurality of slabs include a predetermined number of first ports being arranged at an inlet the third waveguide at equal intervals in a lateral direction perpendicular to a light traveling direction, and input the optical signals, and a predetermined number of second ports being arranged at an outlet of the third waveguide at the equal intervals in the lateral direction so as to face the first ports, and output optical signals. Each of the third waveguides are configured with a dimension that allows light intensity to be distributed at all traveling positions located in the lateral direction.

10 Claims, 7 Drawing Sheets

| NUMBER N OF INPUT PORTS | DIMENSION OF PRESENT EMBODIMENT $(N+1)\times 46\mu m+1mm$ | DIMENSION OF PRIOR ART $(N-1)\times 1.2mm$ |
|---|---|---|
| 10 | 1.5 | 11 |
| 20 | 2.0 | 23 |
| 50 | 3.3 | 59 |
| 100 | 5.6 | 120 |

FIG. 5

| NUMBER N OF INPUT PORTS | NUMBER OF ARRANGED PHASE SHIFTERS OF PRESENT EMBODIMENT | NUMBER OF ARRANGED PHASE SHIFTERS OF PRIOR ART |
|---|---|---|
| | $2N$ | $(N-1)N$ |
| 10 | 20 | 90 |
| 20 | 40 | 380 |
| 50 | 100 | 2450 |
| 100 | 200 | 9900 |

OPTICAL COMMUNICATION ELEMENT AND OPTICAL NEURAL NETWORK

CROSS-REFERENCE TO RELATED APPLICATION

This application is based upon and claims the benefit of priority of the prior Japanese Patent Application No. 2020-21221, filed on Feb. 12, 2020, the entire contents of which are incorporated herein by reference.

FIELD

The embodiments discussed herein are related to an optical communication element and an optical neural network.

BACKGROUND

For example, there is known an optical neural network (NN) that implements the function of an NN processor, whose mainstream is a digital electronic integrated circuit, by a passive optical circuit or the like. In the optical NN, for example, since the inference is supposed to be completed in the traveling time during which the light travels, high throughput and low latency may be achieved until the inference is completed. Furthermore, in the optical NN, for example, consumed power when an optical signal travels in the passive optical circuit is not involved. Thus, in an optical communication element such as a unitary transformation element used to implement the optical NN, it is desired to miniaturize the entire element while increasing the upper limit of the number of ports that can be integrated in the circuit.

Figure 7:
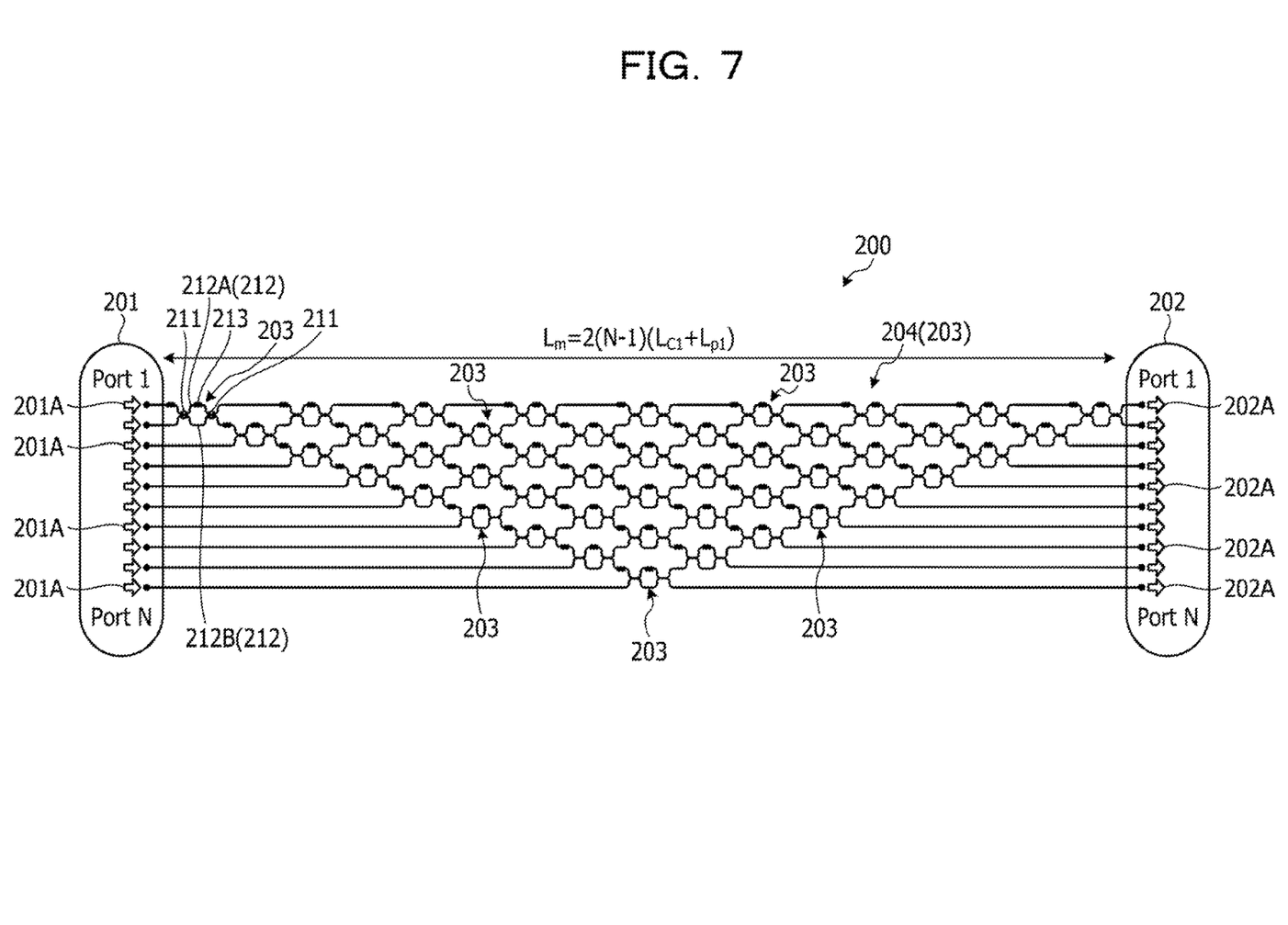
FIG. 7 is an explanatory diagram illustrating an example of a conventional optical NN.

FIG. 7 is an explanatory diagram illustrating an example of a conventional optical NN 200. The optical NN 200 illustrated in FIG. 7 includes an input port group 201, an output port group 202, and a unitary transformation element 204 in which a plurality of Mach-Zehnder (MZ) interference devices 203 are interconnected. The input port group 201 includes N input ports 201A that input optical signals. The output port group 202 includes N output ports 202A that output optical signals. The unitary transformation element 204 is configured by interconnecting the plurality of MZ interference devices 203 between the input port group 201 and the output port group 202. The MZ interference device 203 includes two 2×2 fixed couplers 211, a pair of waveguides 212 that connect the fixed couplers 211 to each other, and a phase shifter 213 that is provided for each one waveguide 212A, which is one of the pair of waveguides 212, and adjusts the phase amount of an optical signal that passes through one of the waveguides 212.

When adjusting the phase amount of an optical signal that passes through one of the waveguides 212, the MZ interference device 203 generates a phase difference between the optical signal that passes through the one waveguide 212A and an optical signal that passes through the other of the waveguides 212, which is referred to as the other waveguide 212B. Then, the MZ interference device 203 adjusts the light intensity of output light according to the generated phase difference. As a result, by adjusting the light intensity of the output light of each MZ interference device 203, the output light may be distributed at any ratio according to a change in the light intensity of the output light. For example, any vector-matrix operations in the optical NN 200 may be implemented using the plurality of interconnected MZ interference devices 203.

Related techniques are disclosed in for example Japanese Laid-open Patent Publication Nos. 2018-200391, and No. 2019-101887.

SUMMARY

According to an aspect of the embodiments, an optical communication element includes a plurality of slabs; an input port group that includes a predetermined number of input ports that input optical signals; an output port group that includes the predetermined number of output ports that output the optical signals; a first waveguide group that includes first waveguides with phase shifters allocated between the input port group and the output port group and provided for each the predetermined number of input ports; and a second waveguide group that includes second waveguides with phase shifters allocated between the input port group and the output port group and provided for each the predetermined number of output ports. The plurality of slabs includes a first slab, a second slab, and a third slab, each of the plurality of slabs includes third waveguide, the third waveguide included in the first slab being connected between the input port group and the first waveguide group, the third waveguide included in the second slab being connected between t the first waveguide group and the second waveguide group, and the third waveguide included in the third slab being connected between the second waveguide group and the output port group. Each of the plurality of slabs include: a predetermined number of first ports that are arranged at an inlet the third waveguide at equal intervals in a lateral direction perpendicular to a light traveling direction, and input the optical signals, and a predetermined number of second ports that are arranged at an outlet of the third waveguide at the equal intervals in the lateral direction so as to face the first ports, and output the optical signals, and each of the third waveguides are configured with a dimension that allows light intensity to be distributed at all traveling positions located in the lateral direction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related art, a horizontal width dimension Lm of the unitary transformation element 204 illustrated in FIG. 7 in a light traveling direction can be expressed by, for example, 2(N−1)×(Lc1+Lp1). N denotes the number of ports of the input ports 201A, Lc1 denotes the horizontal width dimension of the 2×2 fixed coupler 211 in the light traveling direction, and Lp1 denotes the horizontal width dimension of the waveguide 212 with the phase shifter 213 in the light traveling direction. The horizontal width dimension Lm of the unitary transformation element 204 is given as, for example, Lm=(N−1)×1.2 mm when Lc1=100 μm and Lp1=500 μm are employed, and there is no choice but to lower the upper limit of the number N of integratable ports because the dimension is large. Moreover, since the number of phase shifters 213 arranged in the unitary transformation element 204 can be calculated by, for example, (N−1)×N, the number of phase shifters 213 to be controlled to implement any transformation is raised. As a result, the processing burden when controlling the phase shifters 213 to be controlled becomes larger.

This means that, in the conventional unitary transformation element 204, as the number of input ports increases, the horizontal width dimension Lm becomes larger, and accordingly the mounting area of the integrated circuit becomes larger. Moreover, in the conventional unitary transformation element 204, as the number of input ports increases, the number of the arranged phase shifters 213 to be controlled increases, and accordingly the processing burden when controlling the phase shifters 213 to be controlled becomes larger.

In one aspect, it is an object of the present embodiment to provide an optical communication element and an optical neural network for miniaturizing the entire element.

Hereinafter, the embodiments of the optical communication element and the like disclosed in the present application will be described in detail on the basis of the drawings. Note that the disclosed technology is not limited by each of the embodiments. Furthermore, each embodiment to be described below may also be combined as appropriate, without causing inconsistency.

Embodiments

Figure 1:
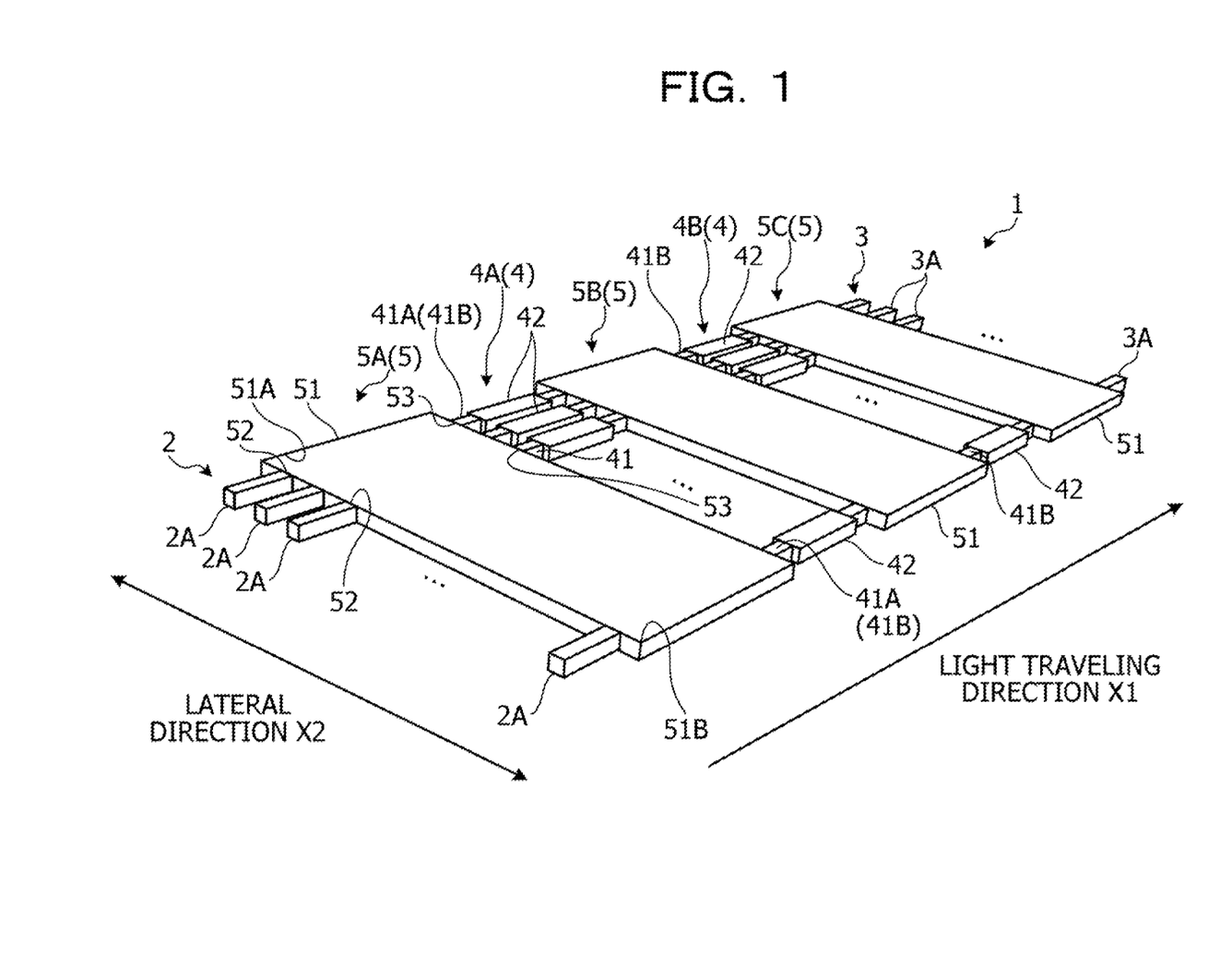
FIG. 1 is a schematic cross-sectional perspective view illustrating an example of an optical communication element of the present embodiment.
Figure 2:
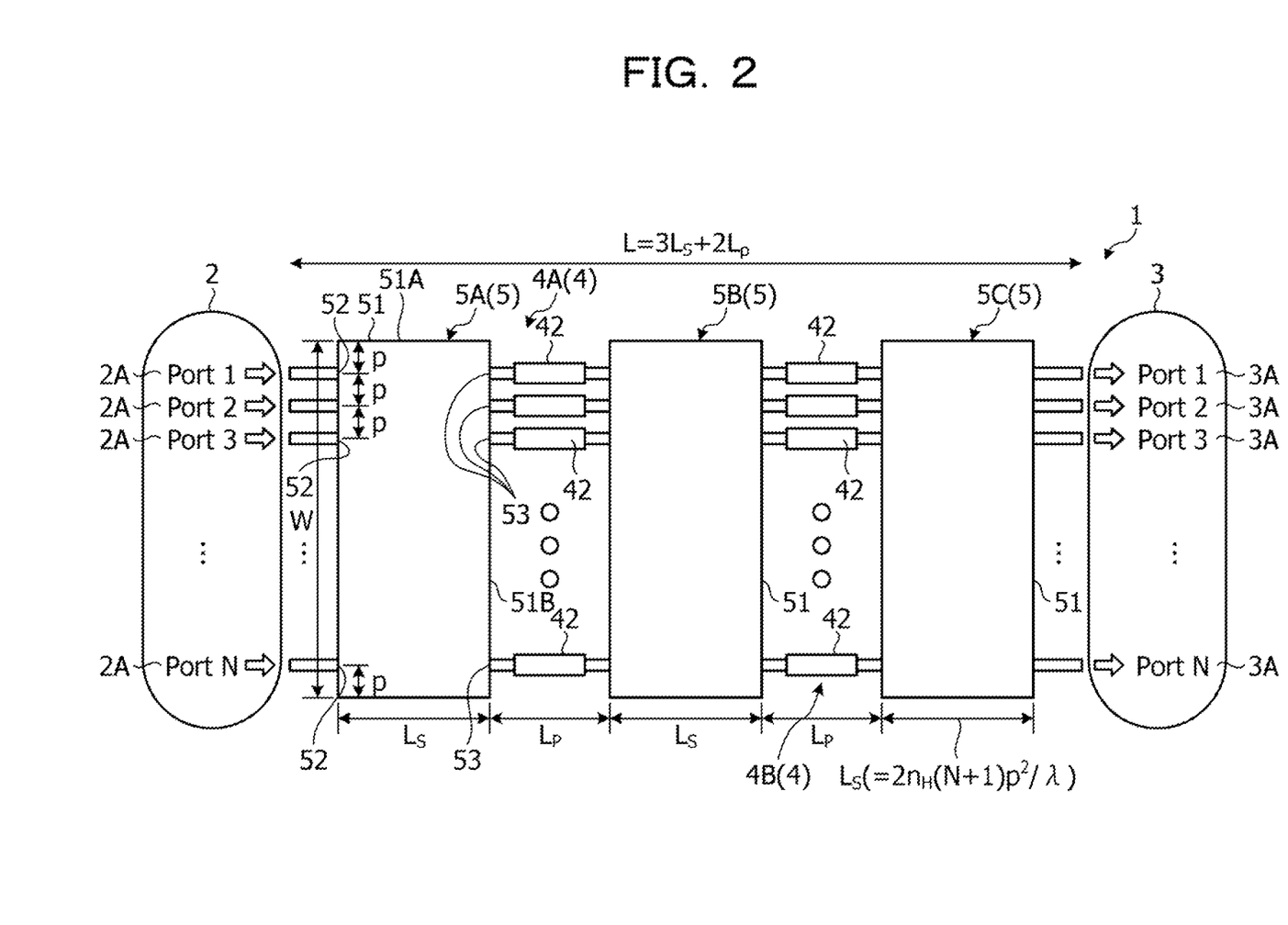
FIG. 2 is an explanatory diagram illustrating an example of the optical communication element.

FIG. 1 is a schematic cross-sectional perspective view illustrating an example of an optical communication element 1 of the present embodiment, and FIG. 2 is an explanatory diagram illustrating an example of the optical communication element 1. The optical communication element 1 illustrated in FIG. 1 includes an input port group 2, an output port group 3, two waveguide groups 4, and three slabs 5. The input port group 2 includes a predetermined number N of input ports 2A that input optical signals. The output port group 3 includes the predetermined number N of output ports 3A that output optical signals.

The two waveguide groups 4 are, for example, a first waveguide group 4A and a second waveguide group 4B. The first waveguide group 4A includes the predetermined number N of first waveguides 41A connected between the input port group 2 and the output port group 3 and provided for each input port 2A. Moreover, the second waveguide group 4B includes the predetermined number N of second waveguides 41B connected between the input port group 2 and the output port group 3 and provided for each output port 3A. The first waveguide 41A and the second waveguide 41B are optical waveguides with phase shifters 42. The phase shifter 42 changes the light intensity of output light by adjusting the phase amount. As a result, the output light may be distributed at any ratio according to the change in the light intensity of the output light. Note that the number of arranged phase shifters 42 used in the optical communication element 1 is, for example, 2N.

The first waveguide 41A and the second waveguide 41B each have a core that functions as an optical path, and a clad surrounding the core. Since the refractive index of the core and the refractive index of the clad are different from each other, the optical signal causes total reflection at a boundary surface between the core and the clad while traveling in a light traveling direction X1. The core is constituted by, for example, a high refractive index material, and the clad is constituted by, for example, a low refractive index material. Note that, in the first waveguide 41A and the second waveguide 41B illustrated in FIGS. 1 and 2, the core portions are illustrated, but the illustration of the clad portions is omitted.

The slab 5 has a flat plate-shaped core and a flat plate-shaped clad, and is configured by surrounding the flat plate-shaped core whose cross-sectional shape extends in the light traveling direction X1, with the flat plate-shaped clad. Since the flat plate-shaped core is constituted by, for example, a high refractive index material, and the flat plate-shaped clad is constituted by, for example, a low refractive index material, light causes total reflection at a boundary surface between the flat plate-shaped core and the flat plate-shaped clad while traveling. Note that, in the slab 5 illustrated in FIGS. 1 and 2, the flat plate-shaped core portions are illustrated, but the illustration of the flat plate-shaped clad portions is omitted.

The slab 5 includes a third waveguide 51, the predetermined number N of first ports 52, and a predetermined number N of second ports 53. The predetermined number N of first ports 52 are arranged at an inlet of the third waveguide 51 at equal intervals p in a lateral direction X2 perpendicular to the light traveling direction X1. The first port 52 is a port that inputs an optical signal to the third waveguide 51. The predetermined number N of second ports 53 are arranged at an outlet of the third waveguide 51 at the equal intervals p in the lateral direction X2 so as to face the first ports 52. The second port 53 is a port that outputs an optical signal from the third waveguide 51. The third waveguide 51 is a multi-mode waveguide having different propagation constants, in which optical signals in single-mode waveguides input from the first ports 52 interfere with each other, and the light intensity at respective traveling positions located in the lateral direction X2 changes according to the traveling of the optical signals. Moreover, the third waveguide 51 is configured with a dimension that allows the light intensity to be distributed at all the traveling positions located in the lateral direction X2 according to the traveling of the optical signals.

In the third waveguide 51, the distance from a concentric axis of the first port 52 among the first ports 52 arranged in the lateral direction X2 to an inner wall 51A of the third waveguide 51 located closest in the lateral direction X2 has the same dimension as the dimension of the interval p between the adjacent first ports 52. In the third waveguide 51, the distance from a concentric axis of the N-th first port 52 to an inner wall 51B of the third waveguide 51 located closest in the lateral direction X2 has the same dimension as the dimension of the interval p between the adjacent first ports 52.

The three slabs 5 are, for example, a first slab 5A, a second slab 5B and a third slab 5C. The first slab 5A includes the third waveguide 51 connected between the input ports 2A in the input port group 2 and the first waveguides 41A in the first waveguide group 4A. The second slab 5B includes the third waveguide 51 connected between the first waveguides 41A in the first waveguide group 4A and the second waveguides 41B in the second waveguide group 4B. The third slab 5C also includes the third waveguide 51 connected between the second waveguides 41B in the second waveguide group 4B and the output ports 3A in the output port group 3.

A vertical width dimension W of the third waveguide 51 denotes the vertical width in the lateral direction X2 perpendicular to the light traveling direction X1, and has a dimension of a length capable of supporting a plurality-of-waveguide mode. Furthermore, a dimension L of the optical communication element 1 denotes the horizontal width of the optical communication element 1 in the light traveling direction X1. The dimension L of the optical communication element 1 can be expressed by, for example, 3Ls+2Lp. Ls denotes the horizontal width dimension of the third waveguide 51 of each slab 5. Lp denotes the horizontal width dimension of the first waveguide group 4A or the second waveguide group 4B in the light traveling direction X1.

The horizontal width dimension Ls of the third waveguide 51 can be expressed by, for example, $2nH(N+1)p^2/\lambda$. Note that nH denotes the refractive index of the flat plate-shaped core in a high refractive index region, $\lambda$ denotes the wavelength of the optical signal that passes through the flat plate-shaped core, N denotes the number of ports, and p denotes the arrangement interval between the adjacent first ports 52. Therefore, the horizontal width dimension L of the optical communication element 1 can be expressed by $6nH(N+1)p^2/\lambda+2Lp$. For example, when nH=3, $\lambda$=1550 nm, and p=2 µm are employed, the horizontal width dimension L of the optical communication element 1 is given as (N+1)×46 µm+1 mm.

Figure 3:
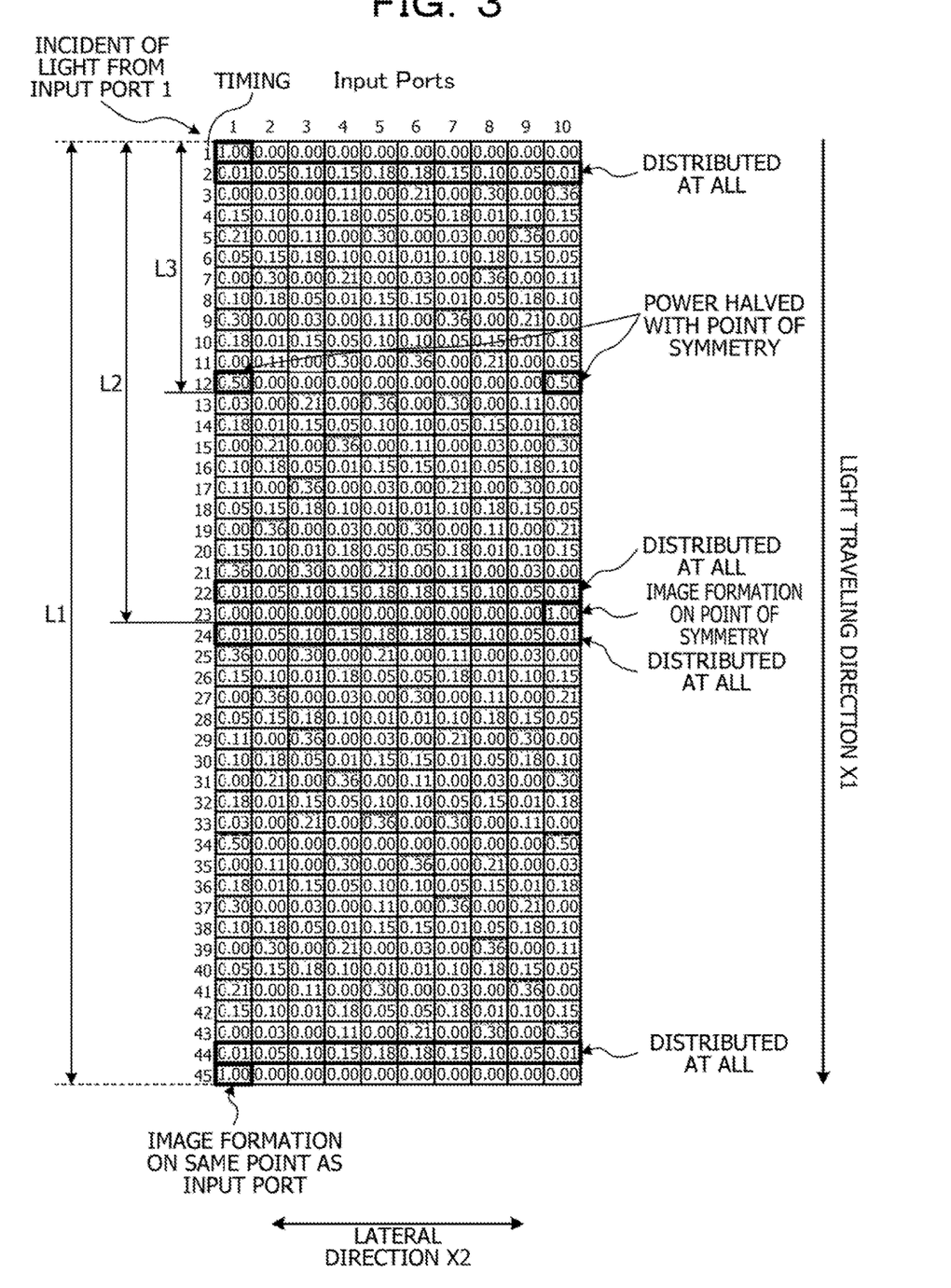
FIG. 3 is an explanatory diagram illustrating an example of distribution of light intensity in a third waveguide for each traveling position located in a lateral direction for each timing in a light traveling direction.

FIG. 3 is an explanatory diagram illustrating an example of distribution of light intensity in the third waveguide 51 for each traveling position located in the lateral direction X2 for each timing in the light traveling direction X1. In the third waveguide 51, for example, the optical signals in single-mode waveguides input from the first ports 52 interfere with each other. The third waveguide 51 excites the waveguide mode in the lateral direction X2 according to the traveling of the optical signals by the mutual interference between the optical signals, and the interference effect of the plurality-of-waveguide mode having different propagation constants causes the light intensity at each traveling position located in the lateral direction X2 to change variously according to the traveling of the optical signals.

For example, when the predetermined number N of first port 52 is 10, and an optical signal is input from a port 1, the distribution of light intensity for each traveling position of ports 1 to 10 in the lateral direction X2 from the timing "1" to the timing "45" in the light traveling direction X1 is assumed. In the light intensity distribution at the timing "1" in the light traveling direction X1 at which the optical signal is input from the port 1, the distribution is such that the light intensity at the traveling position of the port 1 is 1.00 and the light intensity at the traveling positions of the ports 2 to 10 is 0.00.

In the light intensity distribution at the timing "2" in the light traveling direction X1, the distribution is such that the light intensity at the traveling positions of the ports 1 and 10 is 0.01, the light intensity at the traveling positions of the ports 2 and 9 is 0.05, and the light intensity at the traveling positions of the ports 3 and 8 is 0.10. Moreover, in the light intensity distribution, the light intensity at the traveling positions of the ports 4 and 7 is 0.15, and the light intensity at the traveling positions of the ports 5 and 6 is 0.18. This indicates that, in the light intensity distribution at the timing "2", the light intensity is distributed at all the traveling positions of the ports 1 to 10 located in the lateral direction X2.

Then, in the light intensity distribution at the timing "12" in the light traveling direction X1, the light intensity at the traveling positions of the ports 1 and 10 is 0.50 and the light intensity at the traveling positions of the ports 2 to 9 is 0.00. This indicates that, in the light intensity distribution at the timing "12", ½ of the whole light intensity is distributed at each of the traveling position of the port 1 and the traveling position of the port 10, which is a point of symmetry of the port 1.

Moreover, in the light intensity distribution at the timing "22" in the light traveling direction X1, the light intensity is distributed at all the traveling positions of the ports 1 to 10. Additionally, in the light intensity distribution at the timing "23" in the light traveling direction X1, the distribution is such that the light intensity at the traveling positions of the ports 1 and 9 is 0.00 and the light intensity at the traveling position of the port 10 is 1.00. This indicates that, in the light intensity distribution at the timing "22", the distribution is such that the optical signal incident on the port 1 forms an image on the port 10, which is a point of symmetry of the port 1. Besides, in the light intensity distribution at the timing "24" in the light traveling direction X1, the light intensity is distributed at all the traveling positions of the ports 1 to 10.

Moreover, in the light intensity distribution at the timing "34" in the light traveling direction X1, ½ of the whole light intensity is distributed at each of the traveling position of the port 1 and the traveling position of the port 10, which is a point of symmetry of the port 1. In the light intensity distribution at the timing "44" in the light traveling direction X1, the light intensity is distributed at all the traveling positions of the ports 1 to 10. Then, in the light intensity distribution at the timing "45" in the light traveling direction X1, the light intensity at the traveling position of the port 1 is 1.00 and the light intensity at the traveling positions of the ports 2 to 10 is 0.00.

As illustrated in FIG. 3, any timing at which the light intensity is distributed at all the traveling positions of the ports 1 to 10 located in the lateral direction X2 between the timing "1" and the timing "45" is supposed to occur at the timings of "2", "22", "24" and "54". As a result, owing to the distribution of the light intensity at all the traveling positions located in the lateral direction X2, the degree of freedom of unitary transformation, for example, executed by the optical communication element 1 may be maximized.

The distance until the input light to the first first port 52 among the plurality of first ports 52 in the third waveguide 51 forms an image on the first second port 53, which is the distance from the timing "1" to the timing "45", is denoted as L1. Moreover, the distance until the input light to the first first port 52 forms an image on the tenth first port 52, which is a point of symmetry with the first first port 52, which is the distance from the timing "1" to the timing "23", is denoted as L2. In this case, L2 approximates L1/2. Additionally, the distance until the light intensity of the input light to the first first port 52 is halved with respect to the tenth first port 52, which is a point of symmetry with the first first port 52, which is the distance from the timing "1" to the timing "12", is denoted as L3. In this case, L3 approximates L2/2. The vertical width W of the third waveguide 51/the port interval p approximates the number N of input ports.

In the third waveguide 51, the light intensity is supposed to be distributed at all the traveling positions located in the lateral direction X2 at the timings "2", "22", "24" and "54" between the timing "1" and the timing "45" in the light traveling direction X1. Thus, among any timings at which the light intensity is distributed at all the traveling positions located in the lateral direction X2, the timing having a shortest distance from the timing "1" is a timing near L3(p/W), for example, the timing "2". Accordingly, for the horizontal width dimension Ls of the third waveguide 51, it is supposed to be sufficient to ensure the distance from the timing "1" to the timing "2".

Therefore, the distance from the timing "1" to the timing "2" is enough for the horizontal width dimension Ls of the third waveguide 51. This means that the horizontal width dimensions Ls of the third waveguide 51 of the first slab 5A, the third waveguide 51 of the second slab 5B, and the third waveguide 51 of the third slab 5C are each the distance from the timing "1" to the timing "2".

Therefore, the horizontal width dimension L of the optical communication element 1 is given as L=3Ls+2Lp=$6n_H$(N+1)$p^2/\lambda$+2Lp. At this time, when $n_H$=3, $\lambda$=1550 nm, and p=2 μm are employed, L=(N+1)×46 μm+1 mm is given. Consequently, since the horizontal width dimension L of the optical communication element 1 can be made significantly short as compared with the conventional case, the present embodiment may contribute to the miniaturization of the optical communication element 1.

Moreover, the number of arranged phase shifters 42 is given as 2N because one phase shifter 42 of the first waveguide 41A and one phase shifter 42 of the second waveguide 41B are involved for each of N ports, where N denotes the number of ports. Consequently, by significantly reducing the number of the phase shifter 42 arranged in the optical communication element 1, not only the optical communication element 1 may be miniaturized but also the load expected for the control process for the phase shifters 42 may be mitigated.

Figure 4:
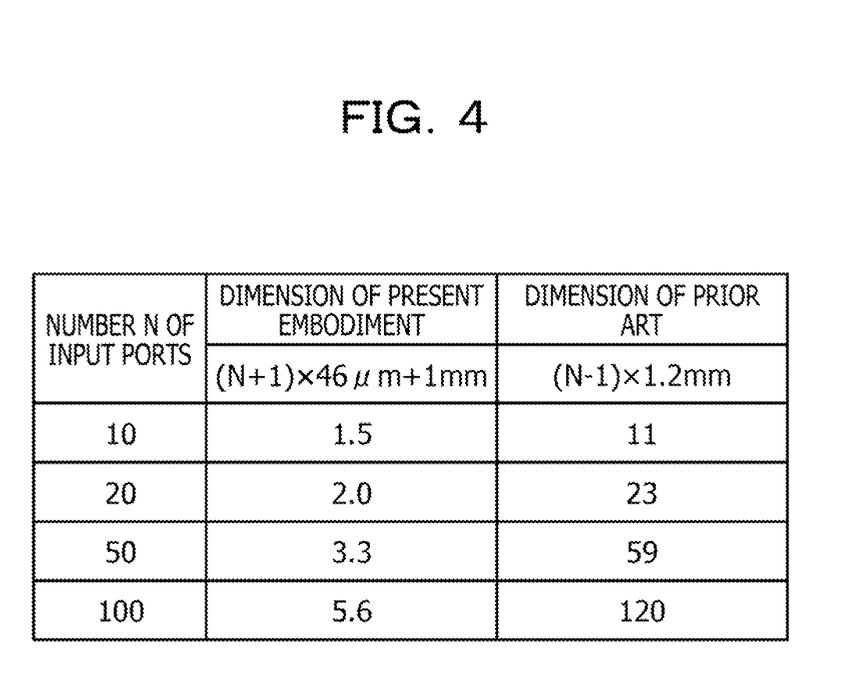
FIG. 4 is an explanatory diagram illustrating an example of comparison results between the present embodiment and prior art in terms of a horizontal width dimension of the optical communication element for each number of input ports.

FIG. 4 is an explanatory diagram illustrating an example of comparison results for the horizontal width dimension L of the optical communication element 1 between the present embodiment and prior art for each number N of input ports. The horizontal width dimension of an optical communication element of the prior art can be calculated by (N−1)×1.2 mm. On the other hand, the horizontal width dimension of the optical communication element 1 of the present embodiment can be calculated by (N+1)×46 μm+1 mm.

For example, when the number N of input ports is 10, the horizontal width dimension of the optical communication element of the prior art is 11 mm, whereas the horizontal width dimension L of the optical communication element 1 of the present embodiment is 1.5 mm. Therefore, the horizontal width dimension L of the optical communication element 1 of the present embodiment may be significantly shortened as compared with the horizontal width dimension of the optical communication element of the prior art. Furthermore, even when the number N of input ports is 20, the horizontal width dimension of the optical communication element of the prior art is 23 mm, whereas the horizontal width dimension L of the optical communication element 1 of the present embodiment is 2.0 mm. In addition, for example, when the number N of input ports is 50, the horizontal width dimension of the optical communication element of the prior art is 59 mm, whereas the horizontal width dimension L of the optical communication element 1 of the present embodiment is 3.3 mm. In addition, when the number N of input ports is 100, the horizontal width dimension of the optical communication element of the prior art is 120 mm, whereas the horizontal width dimension L of the optical communication element 1 of the present embodiment is 5.6 mm. Consequently, the horizontal width dimension L of the optical communication element 1 of the present embodiment may be significantly shortened as compared with the horizontal width dimension of the optical communication element of the prior art.

Figure 5:
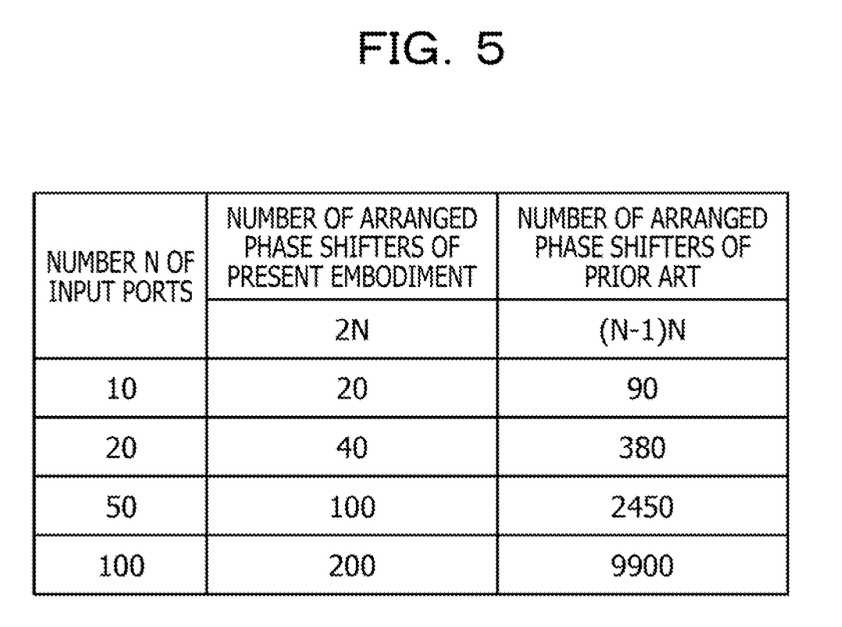
FIG. 5 is an explanatory diagram illustrating an example of comparison results between the present embodiment and the prior art in terms of the number of phase shifters arranged in the optical communication element for each number of input ports.

FIG. 5 is an explanatory diagram illustrating an example of comparison results between the present embodiment and the prior art in terms of the number of the phase shifters 42 arranged in the optical communication element 1 for each number N of input ports. The number of phase shifters arranged in the optical communication element of the prior art can be calculated by (N−1)×N. On the other hand, the number of the phase shifters 42 arranged in the optical communication element 1 of the present embodiment can be calculated by 2N.

For example, when the number N of input ports is 10, the number of phase shifters arranged in the optical communication element of the prior art is 90, whereas the number of the phase shifters 42 arranged in the optical communication element 1 of the present embodiment is 20. Therefore, the number of the phase shifters 42 arranged in the optical communication element 1 of the present embodiment may be significantly reduced as compared with the number of the phase shifters arranged in the optical communication element of the prior art. When the number of input ports is 20, the number of the phase shifters arranged in the optical communication element of the prior art is 380, whereas the number of the phase shifters 42 arranged in the optical communication element 1 of the present embodiment is 40. Furthermore, for example, when the number N of input ports is 50, the number of the phase shifters arranged in the optical communication element of the prior art is 2450, whereas the number of the phase shifters 42 arranged in the optical communication element 1 of the present embodiment is 100. When the number of input ports is 100, the number of the phase shifters arranged in the optical communication element of the prior art is 9900, whereas the number of the phase shifters 42 arranged in the optical communication element 1 of the present embodiment is 200. Consequently, the number of the phase shifters 42 arranged in the optical communication element 1 of the present embodiment may be suppressed significantly as compared with the number of the phase shifters arranged in the optical communication element of the prior art. As the number of the arranged phase shifters 42 is lowered, the processing load for the control of the phase shifters 42 becomes smaller.

The optical communication element 1 of the present embodiment includes the first waveguide group 4A including the first waveguides 41A with the phase shifters 42 connected between the input port group 2 and the output port group 3 and provided for each input port 2A. Moreover, the optical communication element 1 includes the second waveguide group 4B including the second waveguides 41B with the phase shifters 42 connected between the input port group 2 and the output port group 3 and provided for each output port 3A. The optical communication element 1 further includes the slab 5 including the third waveguide 51 connected between the input ports 2A in the input port group 2 and the first waveguides 41A in the first waveguide group 4A. The optical communication element 1 further includes the slab 5 including the third waveguide 51 connected between the first waveguides 41A in the first waveguide group 4A and the second waveguides 41B in the second waveguide group 4B. The optical communication element 1 further includes the slab 5 including the third waveguide 51 connected between the second waveguides 41B in the second waveguide group 4B and the output ports 3A in the output port group 3. As a result, since the two phase shifters 42 are arranged for every waveguides 41A and 41B, the number of the phase shifters 42 mounted on the optical communication element 1 is lowered, such that the phase shifters 42 may be easily controlled.

The slab 5 of the optical communication element 1 includes the predetermined number N of the first ports 52 that are arranged at an inlet of the third waveguide 51 at equal intervals in the lateral direction X2 perpendicular to the light traveling direction X1 and input optical signals to the third waveguide 51. In addition, the slab 5 includes the predetermined number N of the second ports 53 that are arranged at an outlet of the third waveguide 51 at equal intervals in the lateral direction X2 so as to face the first ports 52 and output optical signals from the third waveguide 51. Moreover, the third waveguide 51 is a multi-mode waveguide having different propagation constants, in which optical signals in single-mode waveguides input from the first ports 52 interfere with each other, and the light intensity at respective traveling positions located in the lateral direction X2 changes according to the traveling of the optical signals. Additionally, the third waveguide 51 is configured with a dimension that allows the light intensity to be distributed at all the traveling positions located in the lateral direction X2. As a result, the horizontal width dimension Ls of the third waveguide 51 of the slab 5 may be shortened, such that the horizontal width dimension L of the optical communication element 1 may be made shorter even if the number N of input ports increases. Therefore, the optical communication element 1 can be miniaturized as compared with the prior art.

The third waveguide 51 is configured such that the horizontal width dimension Ls of the third waveguide 51 coincides with the shortest distance in the light traveling direction X1 from the timing "1" to any timing "2", "22", "24", and "44" at which the light intensity is distributed at all the traveling positions located in the lateral direction X2. As a result, the horizontal width dimension Ls of the third waveguide 51 is shortened, such that the optical communication element 1 may be miniaturized.

The horizontal width dimension Ls of the third waveguide 51 has a dimension obtained by L3×(p/W). As a result, the horizontal width dimension Ls of the third waveguide 51 is shortened, such that the optical communication element 1 may be miniaturized.

In the third waveguide 51, the distance from a concentric axis of the first first port 52 among the first ports 52 arranged in the lateral direction X2 to the inner wall 51A of the third waveguide 51 located closest in the lateral direction X2 has the same dimension as the dimension of the interval p between the adjacent first ports 52. Moreover, in the third waveguide 51, the distance from a concentric axis of the N-th first port 52 to the inner wall 51B of the third waveguide 51 located closest in the lateral direction X2 has the same dimension as the dimension of the interval p between the adjacent first ports 52. As a result, in the third waveguide 51, the light intensity at respective traveling positions located in the lateral direction X2 changes according to the traveling of the optical signals, and the light intensity is allowed to be distributed at all the traveling positions located in the lateral direction X2.

The horizontal width dimension Ls of the third waveguide 51 has a dimension obtained by $2nH(N+1)p^2/\lambda$ (where nH: the refractive index in a high refractive index region, $\lambda$: the wavelength of light to be used, N: the number of ports, p: the arrangement interval between the adjacent first ports 52). As a result, the horizontal width dimension Ls of the third waveguide 51 is shortened, such that the horizontal width dimension L of the entire optical communication element 1 may be made shorter even if the number N of input ports increases. The optical communication element 1 may be miniaturized.

Figure 6:
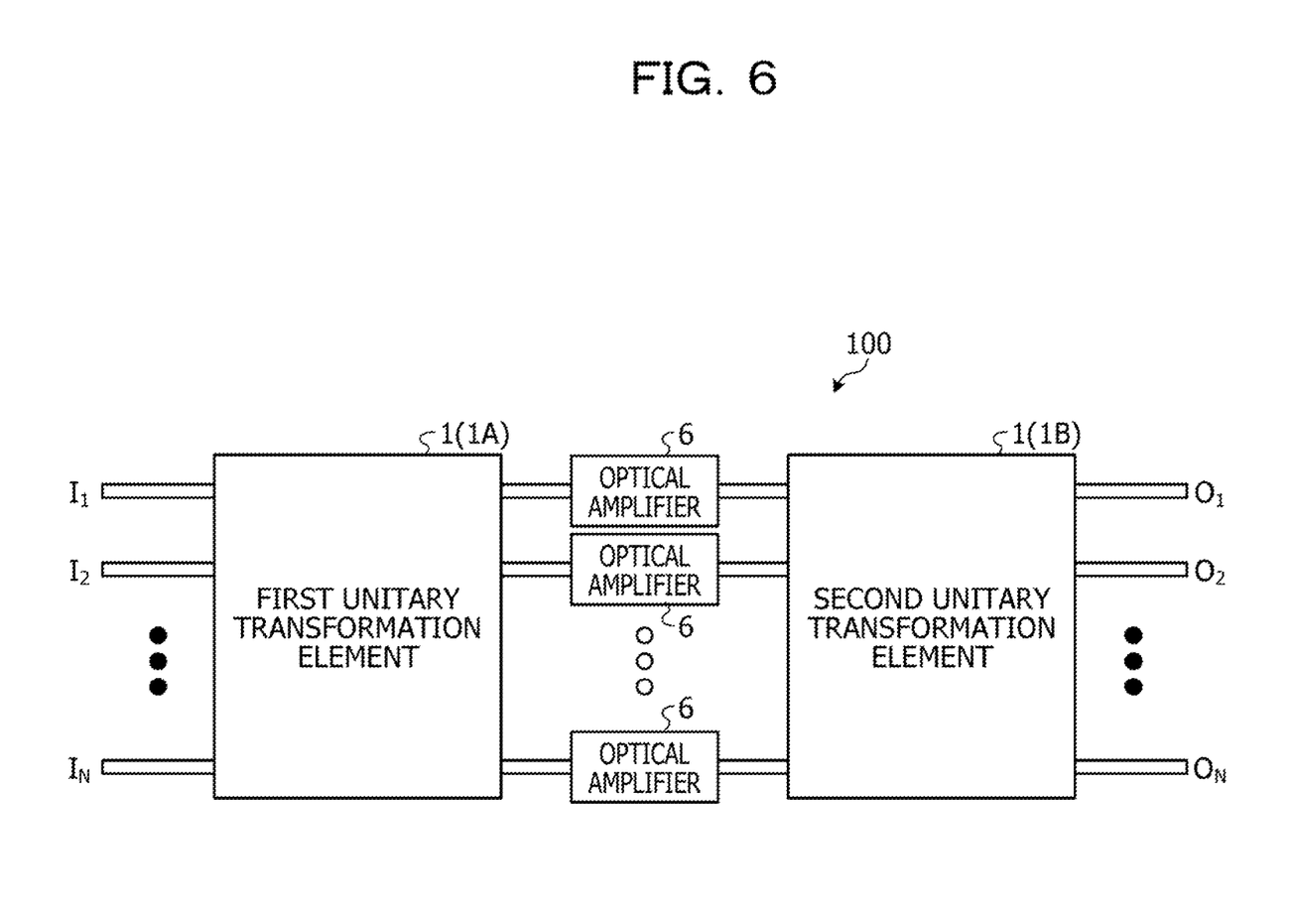
FIG. 6 is an explanatory diagram illustrating an example of an optical NN that adopts unitary transformation elements of the present embodiment.

The optical communication element 1 of the present embodiment may be adopted as a unitary transformation element in an optical neural network, and an embodiment of this case will be described below. FIG. 6 is an explanatory diagram illustrating an example of an optical neural network 100 that adopts unitary transformation elements formed by the optical communication element 1 of the present embodiment. Any neuron operation in the optical neural network 100 can be expressed by a matrix operation of unitary matrix×diagonal matrix×unitary matrix. An ordinary real matrix M can be decomposed as M=USV*. U denotes the m×m unitary matrix, S denotes the m×n diagonal matrix with a non-negative real number diagonally, and V* denotes the complex conjugate of the n×n unitary matrix V. The optical neural network 100 illustrated in FIG. 6 includes a first unitary transformation element 1A (1) that carries out matrix operations using the matrix V, a plurality of optical amplifiers 6 that carry out matrix multiplication using the matrix S, and a second unitary transformation element 1B (1) that carries out matrix operations using the matrix U. The first unitary transformation element 1A receives inputs of a predetermined number N of optical signals, and transforms the predetermined number N of optical signals into the m×m unitary matrix. The first unitary transformation element 1A outputs the predetermined number N of optical signals after unitary transformation.

The optical amplifiers 6 are optical amplifiers provided for each of the predetermined number N of optical signals. The optical amplifiers 6 attenuate the light intensity of the predetermined number N of optical signals after unitary transformation output from the first unitary transformation element 1A. The second unitary transformation element 1B receives inputs of the optical signals attenuated by the respective optical amplifiers 6, and unitarily transforms the attenuated optical signals. The second unitary transformation element 1B outputs the optical signals after unitary transformation.

Since the optical neural network 100 illustrated in FIG. 6 has a configuration in which the optical amplifiers 6 are inserted between the first unitary transformation element 1A and the second unitary transformation element 1B, any matrix operation, which is neuron operation, may be implemented.

Note that, in the present embodiment, the horizontal width dimension Ls of the third waveguide 51 is exemplified as the distance from the timing "1" to the timing "2"; however, the timing is not limited to the timing "2" and any timing is sufficient as long as the light intensity is distributed at all the traveling positions located in the lateral direction X2. As illustrated in FIG. 3, for example, the timings "22", "24" and "54" may be employed and may be selected as appropriate.

Furthermore, each of the constituent elements of the units illustrated in the drawings is not necessarily physically configured as illustrated in the drawings. For example, specific forms of separation and integration of the respective units are not limited to the illustrated forms, and all or some of the units may be functionally or physically separated and integrated in any units according to various loads, use situations, and the like.

Moreover, all or some of various processing functions executed in the respective devices may be executed by a central processing unit (CPU) (or a microcomputer such as a micro processing unit (MPU) and a micro controller unit (MCU)). Furthermore, all or some of the various processing functions may of course be executed by a program analyzed and executed by a CPU (or a microcomputer such as an MPU and an MCU) or hardware using wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical communication element comprising:
a plurality of slabs;
an input port group that includes a predetermined number of input ports that input optical signals;
an output port group that includes the predetermined number of output ports that output the optical signals;
a first waveguide group that includes first waveguides with phase shifters allocated between the input port group and the output port group and provided for each of the predetermined number of input ports; and
a second waveguide group that includes second waveguides with phase shifters allocated between the input port group and the output port group and provided for each of the predetermined number of output ports, wherein
the plurality of slabs includes a first slab, a second slab, and a third slab, each of the plurality of slabs composes third waveguide group, the third waveguide included in the first slab being connected between the input port group and the first waveguide group, the third waveguide included in the second slab being connected between the first waveguide group and the second waveguide group, and the third waveguide included in the third slab being connected between the second waveguide group and the output port group, wherein
each of the plurality of slabs include:
a predetermined number of first ports that are arranged at an inlet of the third waveguide at equal intervals in a lateral direction perpendicular to a light traveling direction, and input the optical signals, and
a predetermined number of second ports that are arranged at an outlet of the third waveguide at the equal intervals in the lateral direction so as to face the first ports, and output the optical signals, and
each of the third waveguides is configured with a dimension that allows light intensity to be distributed at all traveling positions located in the lateral direction.

2. The optical communication element according to claim 1, wherein each of the third waveguides is multi-mode waveguide, where the modes have different propagation constants, in which optical signals in single-mode waveguides input from the predetermined number of first ports interfere with each other, and the light intensity at the respective traveling positions located in the lateral direction changes according to traveling of the optical signals.

3. The optical communication element according to claim 1, wherein
the predetermined number of first ports of first slab and the predetermined number of input ports are same, and
the predetermined number of second ports of the third slab and the predetermined number of output ports are same.

4. The optical communication element according to claim 1, wherein
in each of the third waveguides,
when a configuration is assumed in which, when the predetermined number is denoted as N, the light intensity is distributed only at one of the traveling positions that corresponds to the first of the first ports at the first timing in the light traveling direction at which one of the optical signals is input from the first of first ports,
½ of the light intensity is distributed at each of the traveling positions that corresponds to the first of first ports and an N-th of first ports at a second timing in the light traveling direction,
the light intensity is distributed only at one of the traveling positions that corresponds to the N-th of the first ports at a third timing in the light traveling direction,
½ of the light intensity is distributed at each of the traveling positions that corresponds to the first of first ports and the N-th of first ports at a fourth timing in the light traveling direction, and
the light intensity is distributed only at the one of the traveling positions that corresponds to the first of first port at a fifth timing at which the one of the optical signals is output from a first second port that corresponds to the first of first port,
in a distance between the predetermined number of first ports and the predetermined number of second ports, a shortest distance in the light traveling direction from the first timing to a timing at which the light intensity is distributed at all the traveling positions located in the lateral direction is set to a dimension of each of the third waveguide in the light traveling direction.

5. The optical communication element according to claim 4, wherein
the dimension of each third waveguide in the light traveling direction is a dimension obtained by L3×(p/W)

where L3 is a distance from the first of first port to one of the traveling positions corresponding to the first of first ports at the second timing, p is an interval between the adjacent first ports, and W is a length of each of the third waveguide in the lateral direction.

6. The optical communication element according to claim 4, wherein
the predetermined number of the input ports is N, and
in each of the third waveguides
a distance from a concentric axis of the first of the predetermined number of the input ports arranged in the lateral direction to an inner wall of each third waveguide located closest in the lateral direction has a same dimension as a dimension of an interval between the adjacent input ports, and a distance from a concentric axis of the N-th of the input ports to an inner wall of each third waveguide located closest in the lateral direction has a same dimension as a dimension of an interval between the adjacent input ports.

7. The optical communication element according to claim 1, wherein
the dimension of each slab in the light traveling direction is a dimension obtained by $$2nH(N+1)p^2/\lambda$$

where nH is a refractive index in a high refractive index region, $\lambda$ is a wavelength of light to be used, N is the number of input ports, and p is an arrangement interval between the adjacent input ports.

8. An optical neural network comprising:
a first unitary transformation element that unitary transforms and outputs a predetermined number of optical signals;
an optical amplifier that change an optical intensity of the predetermined number of optical signals being output from the first unitary transformation element; and
a second unitary transformation element that unitary transforms the predetermined number of optical signals being changed by the optical amplifier, wherein
a first unitary transformation element and/or a second unitary transformation element includes:
a plurality of slabs,
an input port group that includes a predetermined number of input ports that input optical signals,
an output port group that includes the predetermined number of output ports that output the optical signals,
a first waveguide group that includes first waveguides with phase shifters allocated between the input port group and the output port group and provided for each the predetermined number of input ports, and
a second waveguide group that includes second waveguides with phase shifters allocated between the input port group and the output port group and provided for each the predetermined number of output ports, wherein the plurality of slabs includes a first slab, a second slab, and a third slab, each of the plurality of slabs composes third waveguide, the third waveguide in the first slab being connected between the input port group and the first waveguide group, the third waveguide in the second slab being connected between the first waveguide group and the second waveguide group, and the third waveguide in the third slab being connected between the second waveguide group and the output port group, wherein
each of the plurality of slabs include:
a predetermined number of first ports that are arranged at an inlet of the third waveguide at equal intervals in a lateral direction perpendicular to a light traveling direction, and input the optical signals, and
a predetermined number of second ports that are arranged at an outlet of the third waveguide at the equal intervals in the lateral direction so as to face the first ports, and output the optical signals, and
each of the third waveguides are configured with a dimension that allows light intensity to be distributed at all traveling positions located in the lateral direction.

9. The optical neural network according to claim 8, wherein each of the third waveguides is multi-mode waveguide, where the modes have different propagation constants, in which optical signals in single-mode waveguides input from the predetermined number of first ports interfere with each other, and the light intensity at respective the traveling positions located in the lateral direction changes according to traveling of the optical signals.

10. The optical communication element according to claim 8, wherein
the predetermined number of the first ports of the first slab and the predetermined number of input ports are same, and
the predetermined number of the second ports of the third slab and the predetermined number of output ports are same.

* * * * *